(12) United States Patent
Xhafa et al.

(10) Patent No.: US 9,036,609 B2
(45) Date of Patent: May 19, 2015

(54) SYSTEMS AND METHODS FOR SILENCING WIRELESS DEVICES

(71) Applicant: Texas Instruments Incorporated, Dallas, TX (US)

(72) Inventors: Ariton E. Xhafa, Plano, TX (US); Yanjun Sun, San Diego, CA (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/496,923

(22) Filed: Sep. 25, 2014

(65) Prior Publication Data
US 2015/0016393 A1  Jan. 15, 2015

Related U.S. Application Data

(63) Continuation of application No. 13/304,852, filed on Nov. 28, 2011, now Pat. No. 8,886,140, and a continuation-in-part of application No. 12/251,187, filed on Oct. 14, 2008, now Pat. No. 8,068,871.

(60) Provisional application No. 61/426,628, filed on Dec. 23, 2010, provisional application No. 61/016,062, filed on Dec. 21, 2007.

(51) Int. Cl.
*H04W 72/12* (2009.01)
*H04W 16/14* (2009.01)
*H04W 88/06* (2009.01)
*H04W 4/00* (2009.01)
*H04W 84/12* (2009.01)

(52) U.S. Cl.
CPC .......... *H04W 72/1215* (2013.01); *H04W 16/14* (2013.01); *H04W 88/06* (2013.01); *H04W 4/008* (2013.01); *H04W 84/12* (2013.01)

(58) Field of Classification Search
CPC .......... H04W 28/048; H04W 72/1215; H04W 72/1242; H04W 88/06; H04W 28/06; H04W 28/04; H04W 28/0205; H04W 72/0446; H04W 84/12; H04W 72/04; H04W 72/02; H04W 84/18; H04W 16/14; H04W 4/008; H04W 76/026; H04W 28/18; H04W 74/085; H04W 74/0816
USPC ......... 370/334, 336, 338, 346–348, 350, 401, 370/449–457, 459; 455/41.2, 127.1, 127.4, 455/448, 501, 502, 509, 552.1, 553.1
See application file for complete search history.

(56) References Cited

U.S. PATENT DOCUMENTS

| | | |
|---|---|---|
| 7,542,728 B2 | 6/2009 | Bitran et al. |
| 7,899,396 B2 | 3/2011 | Meylan et al. |
| 8,045,922 B2 | 10/2011 | Sherman et al. |

(Continued)

*Primary Examiner* — Edan Orgad
*Assistant Examiner* — Ivan O Latorre
(74) *Attorney, Agent, or Firm* — Peter K. McLarty; Frank D. Cimino

(57) ABSTRACT

Embodiments provide systems and methods to optimize the time when to receive transmissions from dissimilar wireless networks, and hence, improve the overall network throughput and avoid access point transmission rate fall-back mechanism having an avalanche effect during coexistence of dissimilar wireless network technologies. A receiver comprises at least two dissimilar network technology subsystems and is able to receive transmissions from dissimilar wireless network technology subsystems during a predetermined reception window.

18 Claims, 5 Drawing Sheets

(56) References Cited

U.S. PATENT DOCUMENTS

| | | | |
|---|---|---|---|
| 8,345,652 B2 | 1/2013 | Banerjea et al. | |
| 8,606,263 B2 | 12/2013 | Banerjea et al. | |
| 2004/0196812 A1* | 10/2004 | Barber | 370/334 |
| 2005/0170776 A1* | 8/2005 | Siorpaes | 455/41.2 |
| 2006/0239223 A1 | 10/2006 | Sherman et al. | |
| 2006/0274704 A1* | 12/2006 | Desai et al. | 370/338 |
| 2007/0153760 A1* | 7/2007 | Shapira | 370/350 |
| 2007/0183383 A1 | 8/2007 | Bitran et al. | |
| 2007/0224935 A1* | 9/2007 | Waxman | 455/41.2 |
| 2007/0281617 A1 | 12/2007 | Meylan et al. | |
| 2008/0130483 A1 | 6/2008 | Khandekar et al. | |
| 2008/0130603 A1* | 6/2008 | Wentink et al. | 370/338 |
| 2008/0227488 A1* | 9/2008 | Zhu et al. | 455/553.1 |
| 2009/0137206 A1 | 5/2009 | Sherman et al. | |
| 2009/0147756 A1* | 6/2009 | Yang et al. | 370/336 |
| 2009/0213827 A1 | 8/2009 | Bitran et al. | |
| 2010/0008338 A1 | 1/2010 | Tsfati et al. | |
| 2010/0284380 A1 | 11/2010 | Banerjee et al. | |
| 2013/0121329 A1 | 5/2013 | Desai et al. | |

\* cited by examiner

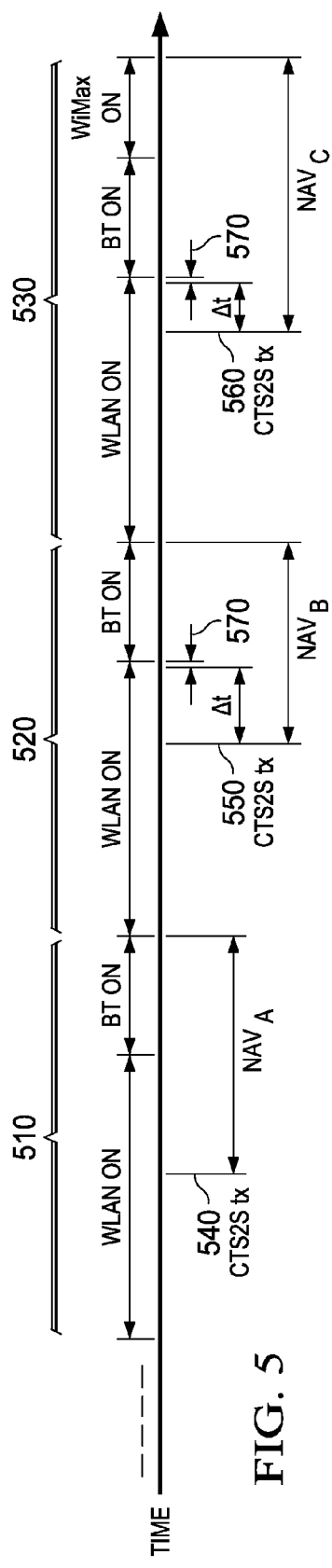
FIG. 5
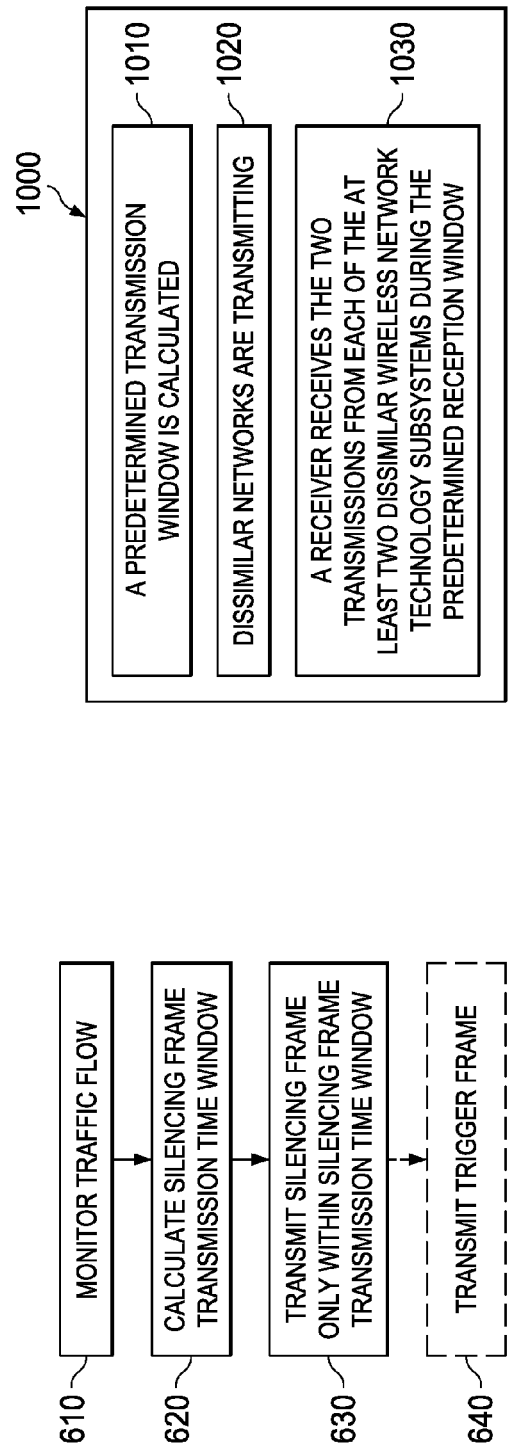
FIG. 10
FIG. 6

SYSTEMS AND METHODS FOR SILENCING WIRELESS DEVICES

CROSS-REFERENCE TO RELATED APPLICATION

This application is a continuation of application Ser. No. 13/304,852, filed Nov. 28, 2011, which claims priority to U.S. Provisional Application No. 61/426,628, filed Dec. 23, 2010 and is a Continuation-in-Part of application Ser. No. 12/251,187, filed Oct. 14, 2008 (now U.S. Pat. No. 8,068,871), which claims the benefit of U.S. Provisional Application No. 61/016,062 filed, Dec. 21, 2007, the entireties of all of which are hereby incorporated by reference.

BACKGROUND

Embodiments of the invention are directed, in general, to communication systems and, more specifically, methods of reducing medium contamination.

Next-generation mobile devices will be able to access a variety of network technologies including, for example, worldwide interoperability for microwave access (WiMAX) networks, wireless local area network (WLAN) networks, long term evolution (LTE) mobile telephony networks, personal area networks (PANs), wireless universal serial bus (USB) networks or BLUETOOTH® (BT) technology networks, etc. The various applications have different transmission timing requirements in order to provide a needed quality of service (QoS). Quality of service refers to mechanisms for controlling resource reservation rather than the achieved service quality. QoS is the ability to provide different priority to different applications, users, or data flows, or to guarantee a certain level of performance to a data flow, e.g., guarantee a required bit rate, delay, jitter, packet dropping probably, bit error rate, etc. Quality of service guarantees are important, for example, if the network capacity is insufficient or limited, especially for real-time streaming multimedia applications such as voice over IP, online games and IP-TV, since these delay sensitive applications often require fixed bit rate.

The IEEE802.11 specification provides a quality of service control protocol that enables a service differentiation to be provided for packets. For example, voice and e-mail traffic require different quality of service levels to provide acceptable service quality. In particular, voice packets need to be delivered within strict delay bounds whereas e-mail packets are more delay tolerant.

While increased access to these technologies will benefit users and operators alike, interference among different technologies, particularly onboard a single device, introduces difficulties during concurrent operation of these technologies. For example, and as illustrated in FIG. 1, wireless local area network ("WLAN"; 2.4-2.5 GHz) and other technologies, such as Bluetooth ("BT";2.4-2.4835 GHz) and Worldwide Interoperability for Microwave Access ("WiMAX";2.3-2.4 GHz and 2.5-2.7 GHz), operate at relatively close and, in some cases, overlapping frequency bands with respect to each other—so close, in fact, that the out-of-band emission by either technology may saturate the receiver of the other technology resulting in potential blocking. Therefore, the interference between these two technologies operating in the same device creates challenges on the coexistence of the corresponding wireless interfaces of that device.

To solve the coexistence problem, in which WLAN technology is one of the subsystems operating in the same device, time multiplexed operation have been proposed if both subsystems share the same antenna. For example, in the case of WLAN and BT coexistence, BT voice calls take priority over other traffic flows in WLAN. During the time periods that the device operates in BT mode, the WLAN operates in unscheduled automatic power saving delivery (U-APSD) mode. During the time that the device operates in WLAN mode, it sends a trigger frame (or a PS-Poll) to the AP indicating that it is ready to receive packets. To protect the network from the avalanche effect (caused by rate fallback mechanism due to the fact that the STA operating in BT can not send ACK packets to the AP, hence the AP reduces the transmission rate) the use of CTS-to-self has been proposed as a viable solution. Thus, before the STA transits to the BT mode, it sends the CTS-to-self frame and reserves the medium until the time that BT transmission ends and the gap/idle BT interval starts. If both subsystems share the same antenna as well as a low noise amplifier (LNA); then reception of packets in both subsystems is possible. Transmission however, is not allowed. Even though the subsystems can both receive, CTS2Self frame is sent to protect from the avalanche effect.

What is needed is a reduced NAV setting by CTS2Self frames by estimating packet received and data rate used to improved time optimization for sending of CTS2Self frames when receive/receive option is enabled for WLAN/BT subsystems.

BRIEF DESCRIPTION OF THE DRAWINGS

Figure 1:
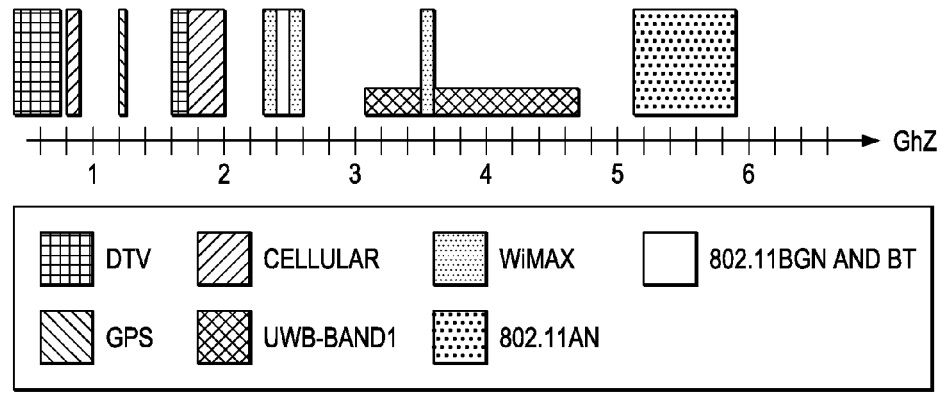

Having thus described the invention in general terms, reference will now be made to the accompanying drawings, which are not necessarily drawn to scale, and wherein:

FIG. 1 is illustrative of different technologies and their operating bands.

Figure 2:
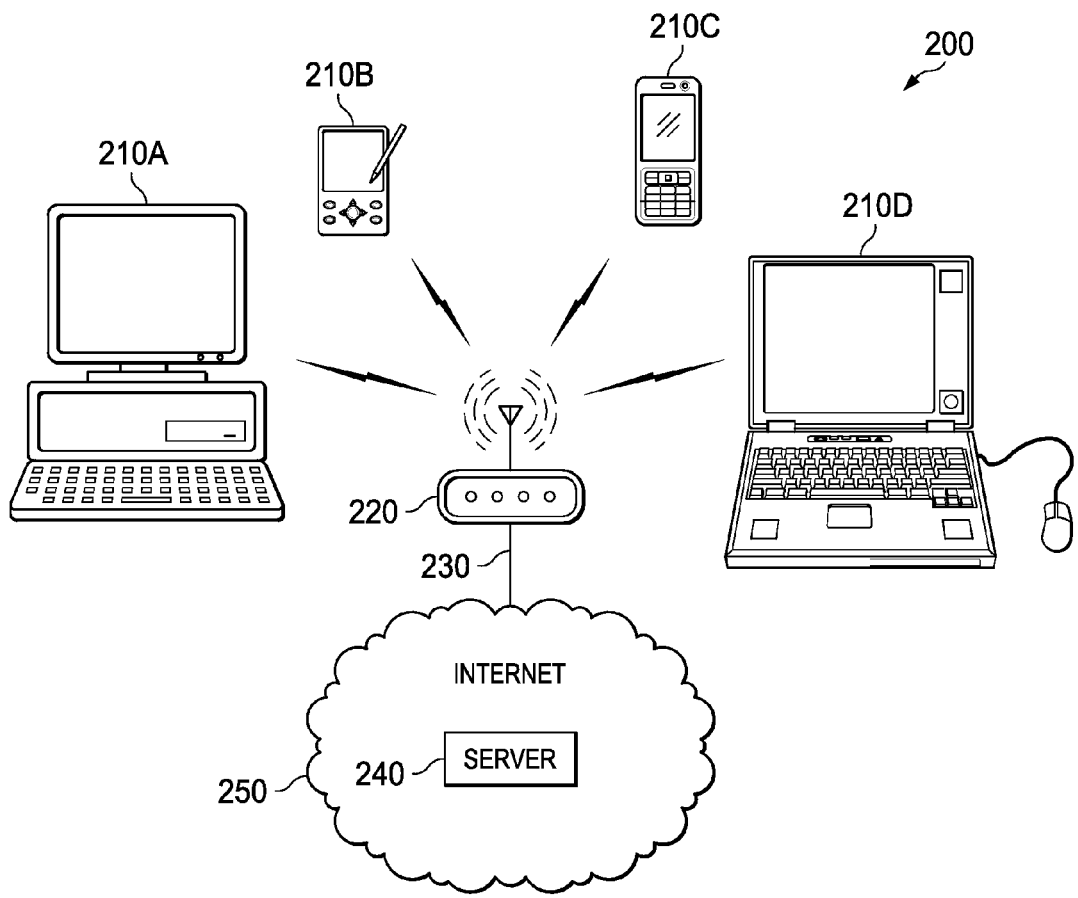
Figure 3:
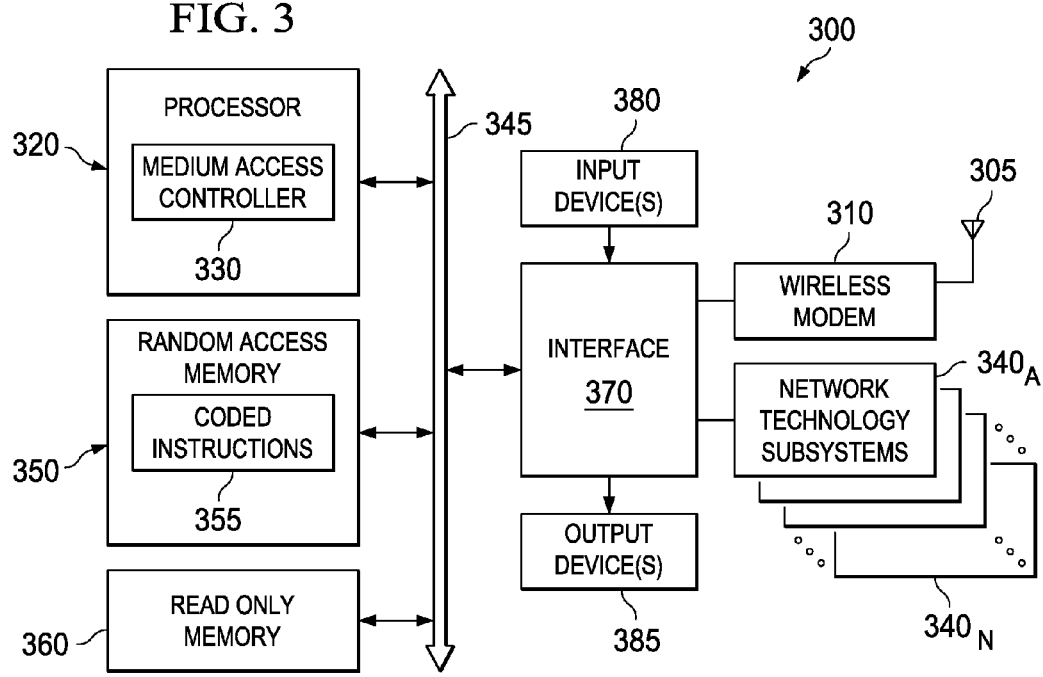
Figure 4:
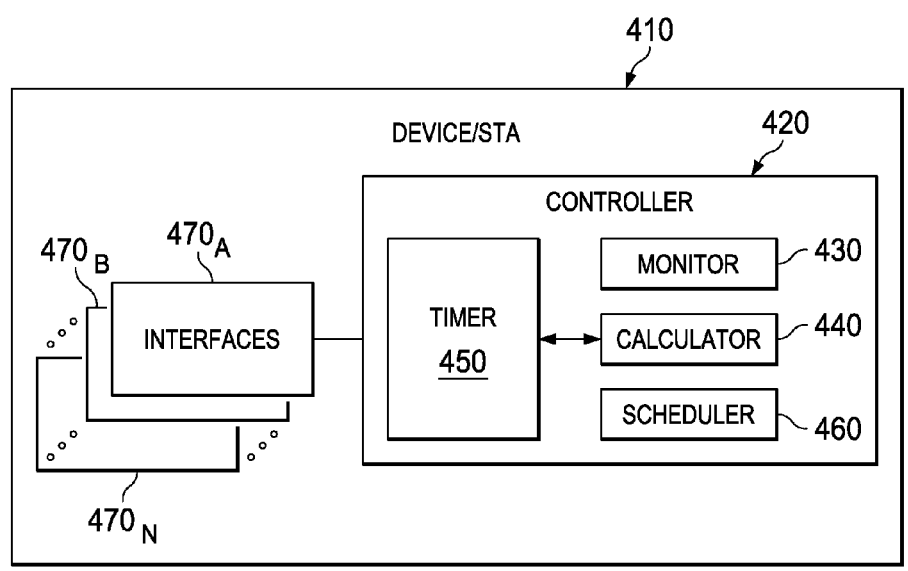
Figure 7:
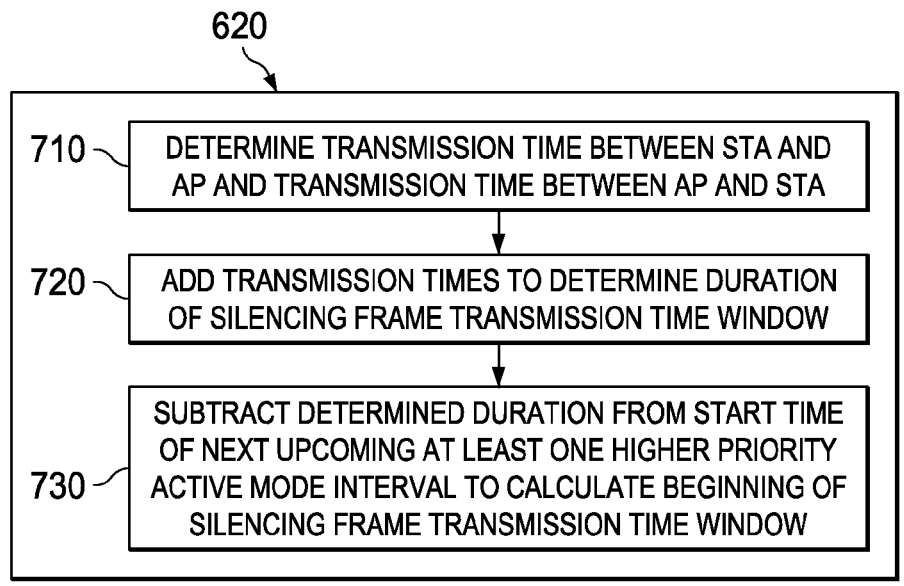
Figure 8:
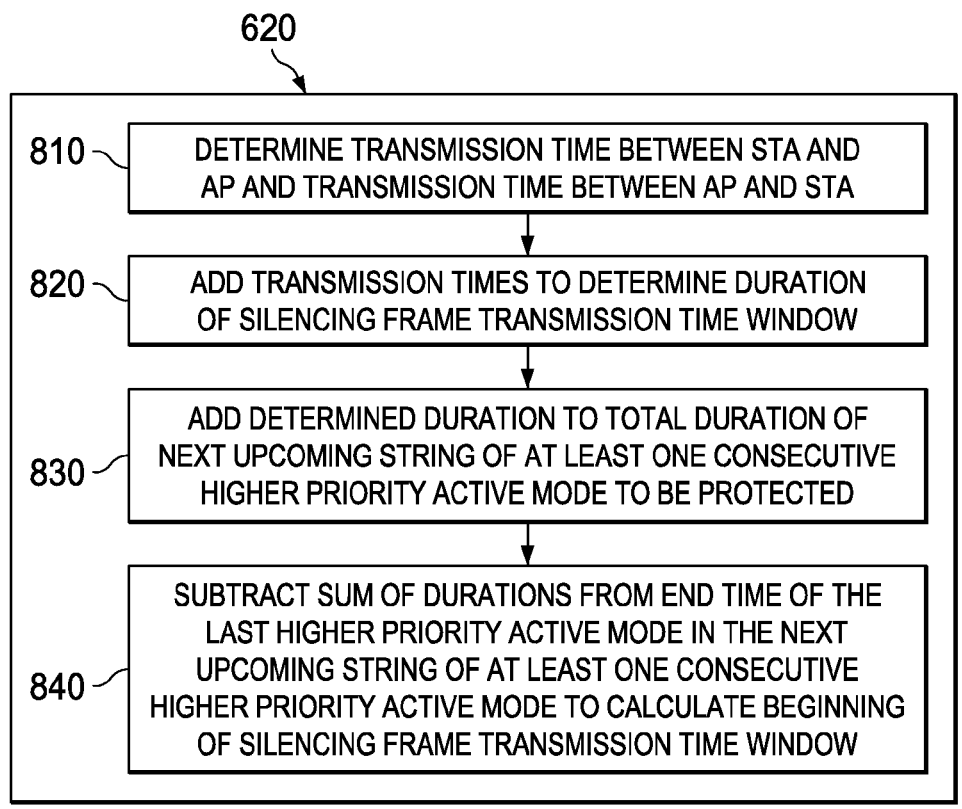
Figure 9:
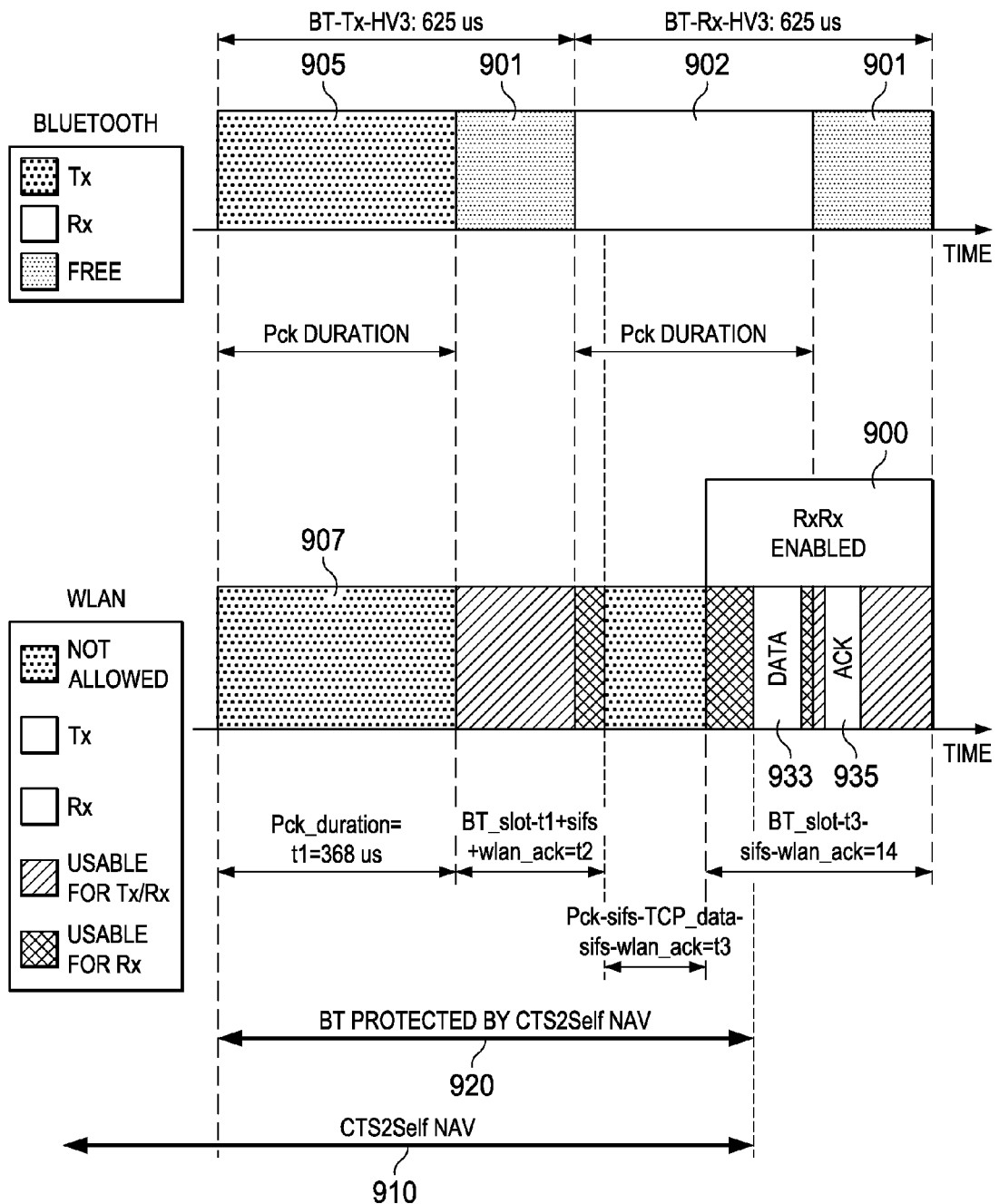

FIG. 2 illustrates an example wireless local area network (WLAN) with an access point and a plurality of wireless devices/stations, according to embodiments;

FIG. 3 illustrates an exemplary access point and/or wireless device, according to embodiments;

FIG. 4 illustrates an exemplary device, according to embodiments;

FIG. 5 illustrates an exemplary timing diagram comparing times for sending silencing frames;

FIG. 6 is a flowchart illustrative of an exemplary method of communicating, according to embodiments;

FIG. 7 is a flowchart illustrative of an exemplary method of determining a preferred silencing frame transmission time, according to embodiments;

FIG. 8 is a flowchart illustrative of another exemplary method of determining a preferred silencing frame transmission time, according to embodiments FIG. 9 illustrates of NAV setting in accordance with an embodiment of the invention; and FIG. 10 is a flowchart illustrative of an exemplary method of communication, according to further embodiments of the invention.

Notation and Nomenclature

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

It should be understood at the outset that although exemplary implementations of embodiments of the disclosure are illustrated below, embodiments may be implemented using any number of techniques, whether currently known or in existence. This disclosure should in no way be limited to the exemplary implementations, drawings, and techniques illustrated below, including the exemplary design and implementation illustrated and described herein, but may be modified within the scope of the appended claims along with their full scope of equivalents.

In working toward solving the coexistence problem, especially when WLAN technology is one of a plurality of network technology subsystems operating in a same device (i.e., onboard network technology subsystems), time-multiplexed operation among the onboard network technology subsystems is useful. For example, and not by way of limitation, in the case of WLAN and BT coexistence, BT voice calls may have priority over other traffic flows in a WLAN. As part of time-multiplexed operation in such exemplary device, during the time periods that the device operates in active BT mode, the WLAN services on the same device preferably operate in unscheduled automatic power saving delivery (U-APSD) mode. When the device switches to operate in active WLAN mode, the device sends a trigger frame (or a PS-Poll) to the access point (AP) indicating that the device is ready to act as a receiver, e.g., to receive packets of information. The AP may also be referred to herein as a transmitter, e.g., a transmitter of data packets. For the sake of discussion at this point, assume the transmitted packets of information—normally containing data—are correctly routed to the device as the intended recipient. Transmission becomes problematic if the packets addressed to the device are sent by the AP within the time period that the device is operating in active WLAN mode but the device has insufficient time to reply with an ACK (in case of immediate acknowledgment) because, for example, the device has switched back to active BT mode (e.g., incoming voice data) and misses the packet transmitted by the AP; as a result, no ACK would be sent by the device. As a further example, if the packets sent by the AP are not sent within the time interval that the device is operating in active WLAN mode, again no ACK would be sent by the device.

When the AP fails to receive an ACK from its intended recipient device, a transmission rate-fall back mechanism commences at the AP. This mechanism reduces the transmission rate used to send subsequent packets from the AP to the device based on the failure to receive an ACK from the STA. In other words, when the AP transmits a packet to the intended device—also referred to herein as a STAtion (STA)—and the AP receives no corresponding ACK from that device/STA, then the AP reduces the current transmission rate to a lower (slower) transmission rate because the AP assumes the communication channel between itself and the intended STA is bad.

Although the packet size does not change, as the transmission rate decreases, the total duration of the packet lengthens, which in turn results in an increased probability that the duration of the AP wireless transmission and the time the device is involved with a BT reception will time-wise overlap. Worse, as the packets transmitted over the channel medium occupy ever-lengthening intervals, the corresponding probability of a collision (time-wise overlapping) with the use by the device/STA of the medium on behalf of a different network technology subsystem (in the present example, in active BT mode), quickly increases. With the increased probability of collisions comes increased likelihood of the AP more often failing to receive an ACK, and in response continuing to lower the transmission rate (thereby increasing the duration of the transmission of the packet and, naturally, increasing the probability of a further collision such that the STA fails (again) to receive the packet, and fails (again) to send an ACK. It can be quickly appreciated that as this cycle proceeds, performance of the device STA rapidly deteriorates. This is unacceptable for many reasons, including violation of QoS (quality of service) requirements. Another reason stems from the practice of an AP to continue reducing the transmission rate until reaching a predetermined threshold, at which time the AP may unilaterally disconnect the device/STA from the network because the AP would not be able to transfer much if anything at all to the device above that threshold. The rapid deterioration in performance—and associated increase in probability of collision—is what will be referred to herein as an "avalanche effect" because, as time progresses, the message becomes buried and unrecoverable/lost. Simply, the avalanche effect reflects the phenomenon that the probability of losing a packet, and risk of potentially being unwillingly disconnected from the system, increases as the rate of transmission decreases.

To protect the network from the avalanche effect, embodiments employ a silencing frame. One example of a silencing frame, and not by way of limitation, would be a clear-to-send-to-self (CTS-to-self) frame. Thus, before the STA transitions to an active BT mode, the STA device sends the silencing frame and reserves the medium until the time corresponding to the end of the active BT mode or the end of that BT transmission ends—as the case may be—and the next lower priority network technology, e.g., WLAN, interval commences. However, it has become apparent that the use of silencing frames to protect priority interval transmissions from the avalanche effect in coexisting dissimilar technology subsystem networks drastically reduces the throughput of lower priority interval (e.g., WLAN, etc.) transmissions because devices/stations must defer (be silent) during the time set by the duration field (NAV) in the silencing frame. Thus, sending the silencing frame too early, results in other STAs/devices in the network—for example those on the WLAN—having to be quiet (deferring) for at least the entire BT active mode interval. This early deference, in turn, results in significantly decreased throughput of the network.

In light of the foregoing, embodiments are directed in general, to communication systems, and more specifically, to systems and methods of silencing wireless devices in coexistence networks to avoid triggering the AP transmission rate fall-back mechanism and still improve the performance of network resources. Embodiments provide systems and methods to optimize the time when to send silencing frames, and hence, improve the overall network throughput while avoiding avalanche effects.

FIG. 2 illustrates an example wireless local area network (WLAN) 200 with a plurality of wireless devices/stations—referred to individually herein as device, station, STA or device/station—and an access point (AP), according to embodiments. It should be appreciated that the network of FIG. 2 is meant to be illustrative and not meant to be exhaustive; for example, it should be appreciated that more, different or fewer communication systems, devices and/or paths may be used to implement embodiments. To provide wireless data and/or communication services (e.g., telephone services, Internet services, data services, messaging services, instant messaging services, electronic mail (email) services, chat services, video services, audio services, gaming services, etc.), the exemplary WLAN 200 comprises access point (AP) 220 and any of a variety of fixed-location and/or mobile wireless devices or stations (STAs), four of which are respectively designated in FIG. 2 with reference numerals 210A, 210B, 210C and 210D. Exemplary devices 210 include any variety of personal computer (PC) 210A with wireless communication capabilities, a personal digital assistant (PDA) 210B, an MP3 player, a wireless telephone 210C (e.g., a cellular phone, a Voice over Internet Protocol (VoIP) telephonic functionality, a smart phone, etc.), and a laptop computer 210D with wireless communication capabilities, etc. At least one of AP 220 and STAs 210A-D are preferably implemented in accordance with at least one wired and/or wireless communication standard (e.g., from the IEEE 802.11 family of standards). Further, at least one device 210 comprises a plurality of co-existing wireless network technology subsystems onboard the at least one device 210. In at least some embodiments, device 210 consists of a WLAN network and a BT network. The WLAN network may handle File Transfer Protocol (FTP), with internet file download, and e-mail traffic, while the BT network may handle synchronous connection-oriented high-quality voice level 3 (SCO HV3) traffic. STA is a WLAN and BT node and transmissions in different networks are preferably achieved via a time-duplexing approach (ON/OFF). It will be noted that reference to "STA" (station) may be used herein as a shorthand reference to "STA1", "device 210" and "device 410" during respective discussions to aid in ease of understanding.

In the example of FIG. 2, to enable the plurality of devices/STAs 210A-D to communicate with devices and/or servers located outside WLAN 200, AP 220 is communicatively coupled via any of a variety of communication paths 230 to, for example, any of a variety of servers 240 associated with public and/or private network(s) such as the Internet 250. Server 240 may be used to provide, receive and/or deliver, for example, any variety of data, video, audio, telephone, gaming, Internet, messaging, electronic mail, etc. service. Additionally or alternatively, WLAN 200 may be communicatively coupled to any of a variety of public, private and/or enterprise communication network(s), computer(s), workstation(s) and/or server(s) to provide any of a variety of voice service(s), data service(s) and/or communication service(s).

The systems and methods described herein may be implemented on any general-purpose computer with sufficient processing power, memory resources, and network throughput capability to handle the necessary workload placed upon it. FIG. 3 illustrates an exemplary, general-purpose computer system suitable for implementing at least one embodiment of a system to respond to signals as disclosed herein. Illustrated exemplary device 300 which may be an access point and/or wireless device, according to embodiments. It should be expressly understood that any device on, for example, WLAN 200 or other embodiments, may at times be an access point and at other times be a station. It should also be understood that in some embodiments, there may be at least one dedicated access point, with any number of devices acting as stations.

Exemplary device 300 comprises at least one of any of a variety of radio frequency (RF) antennas 305 and any of a variety of wireless modems 310 that support wireless signals, wireless protocols and/or wireless communications (e.g., according to IEEE 802.11n). RF antenna 305 and wireless modem 310 are able to receive, demodulate and decode WLAN signals transmitted to and/or within a wireless network. Likewise, wireless modem 310 and RF antenna 305 are able to encode, modulate and transmit wireless signals from device 300 to and/or within a wireless network. Thus, RF antenna 305 and wireless modem 310 collectively implement the "physical layer" (PHY) for device 300. It should be appreciated that device 300 is communicatively coupled to at least one other device and/or network (e.g., a local area network (LAN), the Internet 250, etc.). It should further be understood that illustrated antenna 305 represents one or more antennas, while the illustrated wireless modem 310 represents one or more wireless modems.

The exemplary device 300 further comprises processor(s) 320. It should be appreciated that processor 320 may be at least one of a variety of processors such as, for example, a microprocessor, a microcontroller, a central processor unit (CPU), a main processing unit (MPU), a digital signal processor (DSP), an advanced reduced instruction set computing (RISC) machine (ARM) processor, etc. Processor 320 executes coded instructions 355 which may be present in a main memory of the processor 320 (e.g., within a random-access memory (RAM) 350) and/or within an on-board memory of the processor 320. Processor 320 communicates with memory (including RAM 350 and read-only memory (ROM) 360) via bus 345. RAM 350 may be implemented by DRAM, SDRAM, and/or any other type of RAM device; ROM 360 may be implemented by flash memory and/or any other type of memory device.

Processor 320 implements MAC 330 using one or more of any of a variety of software, firmware, processing thread(s) and/or subroutine(s). MAC 330 provides medium access controller (MAC) functionality and further implements, executes and/or carries out functionality to facilitate, direct and/or cooperate in avoiding avalanche effect. MAC 330 is implemented by executing one or more of a variety of software, firmware, processing thread(s) and/or subroutine(s) with the example processor 320; further, MAC 330 may be, additionally or alternatively, implemented by hardware, software, firmware or a combination thereof, including using an application specific integrated circuit (ASIC), a programmable logic device (PLD), a field programmable logic device (FPLD), discrete logic, etc.

Device 300 also preferably comprises at least one input device 380 (e.g., keyboard, touchpad, buttons, keypad, switches, dials, mouse, track-ball, voice recognizer, card reader, paper tape reader, etc.) and at least one output device 385 (e.g., liquid crystal display (LCD), printer, video monitor, touch screen display, a light-emitting diode (LED), etc.)—each of which are communicatively connected to interface 370.

Interface 370, additionally or alternatively, communicatively couples wireless modem 310 with processor 320 and/or MAC 330. Interface 370 enables interface to, for example and not by way of limitation, Ethernet cards, universal serial bus (USB), token ring cards, fiber distributed data interface (FDDI) cards, network interface cards, wireless local area network (WLAN) cards, etc. to enable device 300 to communicate with other devices and/or communicate via Internet 250 or at least one intranet. With such a network connection, it is contemplated that processor(s) 320 would be able to receive information from at least one type of network technology, and/or output information to at least one type of network technology in the course of performing the herein-described processes. It should be appreciated that interface 370 implements at least one of a variety of interfaces, such as an external memory interface, serial port, communication internal to device 300, general purpose input/output, etc.

Device 300 further comprises at least two dissimilar network technology subsystems 340; as a result, device 300 is said to have co-existing network technology. "Dissimilar" is used in this context to mean that at least one of the subsystems 340 is from a different network technology than another one of the subsystems 340. It should be understood that some embodiments of subsystems 340 may have their own dedicated wireless modem and antenna, while other embodiments may share either or both of a wireless modem and antenna. Embodiments of device 300 comprise at least two wireless network technology subsystems 340. FIG. 3 illustrates network technology subsystems 340A-340N, where N=the number network technology subsystems in device 300. Examples of network technologies that may be represented by such subsystems include, but are not limited to, worldwide interoperability for microwave access (WiMAX) networks, wireless local area network (WLAN) networks, long term evolution (LTE) mobile telephony networks, personal area networks (PANs), wireless universal serial bus (USB) networks, BLUETOOTH (BT) networks, etc. Processor 320 interacts with network technology subsystems 340 via corresponding interfaces 470A-470N (see FIG. 4) implemented by interface 370. It should be appreciated that, for the ease of illustration, only two or three such network technologies may be discussed in connection with any particular embodiment, that more or fewer such technologies may be onboard a device, and that the present teachings apply equally thereto.

Before proceeding further, it should be understood that, for ease of understanding, embodiments will mostly be described herein in connection with a single lower priority technology network and a single higher priority technology network. However, embodiments should in no way be considered limited to just these two onboard technology network subsystems. In some embodiments, there may be additional and/or different onboard technology network subsystems. In some embodiments, there may be at least one lower priority technology network (e.g., WLAN, etc.) and a plurality of higher priority technology networks (e.g., BT, WiMAX, etc.). It should be appreciated that the scope of the present invention is not intended to be constrained to a single lower priority technology network and a single higher priority technology network onboard a device.

As illustrated in FIG. 4, an exemplary device 410 comprises a controller 420 and interfaces 470A-470N, where N=the number of onboard network technologies corresponding to each of the respective dedicated interfaces. Controller 420, in turn, comprises monitor 430, calculator 440, timer 450 and scheduler 460. It should be appreciated that although the example device of FIG. 4 illustrates controller 420 as comprising, monitor 430, calculator 440, timer 450 and scheduler 460, that some or several of these elements may be external to controller 420. Moreover, it should also be appreciated that, in many embodiments, controller 420 also comprises additional functionality such as security inputs (often from a user), managing power saving features for the interfaces, etc. Embodiments of device 410 consist of wireless—and, in some cases, wired—links. Because at least some of the links are wireless, some communications may interfere with each other. For example, it may not be possible for two links to be active at the same time because the transmission of one interferes with the transmission of the other. Preferably time-division multiplexing is used where interfering links operate at different times, but embodiments of scheduler 460 preferably understand the priority and parameters of each onboard network technology, as well as any negotiated parameters established during initial association with an AP.

Controller 420 schedules the duration each active network traffic flow may keep priority on device 410's resources. There are a variety of scheduling options, one of which may be fair allocation. Generally, the device alternates among the various active traffic flows—corresponding to each of the initiated network technology subsystems represented on device 410—depending upon each service/traffic flow's priority as determined by scheduler 460. Each network preferably takes sequential turns in using device 410's resources to send packets to—or otherwise communicate with—networks outside of device 410. Often, the scheduler will establish a periodic transmission time for each onboard technology network subsystem, for improved and efficient use of device 410's resources. The periodic transmission(s) may also be provided to the AP(s) within any particular network to enable network-specific transmissions by the AP(s) during known network-specific active modes (reception) intervals. Scheduler 460 knows to transmit silencing frame during the period of $\Delta t$ until start of higher priority active mode interval—if it can—otherwise, no silencing frame is to be transmitted. Once the higher priority active mode interval has ended, and a lower priority active mode has begun, scheduler 460 will again attempt to transmit a silencing frame during the period of $\Delta t$—as determined by calculator 440—until start of higher priority active mode interval. As before, if the silencing frame cannot be transmitted prior to the start of the next immediate interval for higher priority active mode, no further effort is made to transmit a silencing frame. This process repeats so long as higher priority active mode intervals continue to be scheduled.

Controller 420 calls monitor 430 to monitor traffic flow; in some embodiments, monitor 430 only monitors the existence of active traffic flows onboard device 410, while in other embodiments, monitor 430 also monitors what network technology (e.g., WLAN, BT, WiMAX, etc.) and what type of transmission (e-mail, streaming video, VoIP, etc.) are affected. It should be appreciated that embodiments involve traffic flows regardless of type of traffic or whether the traffic is unicast, broadcast, multicast, etc.

Additionally, in at least some embodiments, controller 420 employs monitor 430 to track changes in the active traffic flows. If monitor 430 determines that there has been a change in at least one of the active traffic flows, it also identifies the change. As one example, and not by way of limitation, a WLAN MAC sends a trigger to controller 420 indicating that it wants to add traffic, i.e., initiate a traffic flow. Embodiments of scheduler 460 dynamically focus on scheduling and prioritizing among the service calls (requests) based on the information gathered by monitor 430.

Embodiments of calculator 440 perform various calculating functions, including, but not necessarily limited to, determining Δt to be used by scheduler 460. Calculator 440 employs timer 450, as well as registers, to establish the transit time(s) between AP and STA (device 410 in the FIG. 4). At least some embodiments of calculator 440 calculate the Δt time interval as follows:

$$\Delta t = \max\_i(\text{AP to STA1 Tx Time} + \text{STA1 to AP Tx Time})$$

where "i" is the traffic flow indication from the AP to the STA and the latest duration values for each traffic flow duration are used to select the maximum value.

It should be appreciated that the time taken to transmit the silencing frame (e.g., CTS-to-self frame, in the present example) and, in some embodiments, trigger frame (e.g., trigger frame-ACK, in the present example) from STA to the AP can be calculated because the STA device is the one initiating the transmission. Moreover, the time that the AP takes to transmit to the STA device can also be estimated from earlier transmissions, or may be a negotiated maximum transmitted size from the AP to STA in view of their negotiated data rates upon initial association. It should be appreciated that if the time the AP takes to transmit to the STA device is estimated from previous transmissions, it is preferred that the data rate and packet size from the most recent received transmission should be selected as the parameters from which to determine the AP to STA transmission time. Moreover, if there are multiple active traffic flows from AP to STA (e.g., belonging to different categories that may have different data rates and different packet sizes), because the STA will not know what the AP will send in response to the STA device's silencing frame, at least some embodiments of STA device preferably choose the maximum transmission time (data rate×packet size) among the transmission times most recently received with respect to each of the multiple active traffic flows. It should be appreciated that in some embodiments, the maximum duration among the earlier transmissions could be selected, although this selection tends to minimize the benefits of the present invention. In at least some embodiments, the time to transmit the silencing frame (plus trigger frame, depending upon embodiments) plus time the AP takes to transmit to the STA equals Δt. It should be appreciated that once either parameter—data rate and/or data packet size— has been calculated, it may be stored in memory or a hardware register to be used in future determinations of preferred time for transmission of a silencing frame, including use for comparisons among respective parameter values to ascertain quality of medium, etc.

Calculator 440 adds the established transit time(s), i.e., Δt, to the duration of the at least one higher priority interval to be protected to determine a duration (value). In some embodiments, calculator 440 also subtracts the determined duration from the known ending time of the at least one higher priority interval to be protected and identifies the resulting time as the preferred time for transmission of a silencing frame; this preferred time is provided to scheduler 460. In other embodiments, calculator 440 subtracts Δt from the known beginning time of the next immediate at least one higher priority interval to be protected and identifies the resulting time as the preferred time for transmission of a silencing frame; as with other embodiments, this preferred time is provided to scheduler 460. Scheduler 460 directs controller 420 to transmit a silencing frame (e.g., CTS2S frame) at the preferred time. The preferred time occurs Δt prior to the beginning edge of BT active mode (FIG. 5). It should be appreciated that "Δt" will be used to refer to the amount of time (a value) prior to the next immediate higher priority technology network active mode interval during which it is preferred for the device to transmit a silencing frame. As noted above, if controller 420 (via scheduler 460) is unable to transmit a silencing frame during the Δt period of time, then no silencing frame is sent with respect to the next immediate higher priority active mode interval.

Calculator 440 also determines the end time of the predetermined transmission window by subtracting the time it takes to at least completely transmit the silencing frame from the known beginning time of the next immediate at least one higher priority interval to be protected; calculator 440 identifies the resulting time as the ending time of the predetermined transmission window. By so determining the ending time of the transmission window, the scheduler 460 directs controller 420 to complete the transmission of the silencing frame in sufficient time prior to the beginning of the interval(s) to be protected—assuming the medium is not busy. If the medium is busy so that the transmission of the silencing frame cannot be completed prior to the beginning of the interval(s) to be protected (i.e., within the beginning and ending times of the predetermined transmission window), then scheduler 460 directs controller 420 to send no silencing frame, and device/STA 410 transitions to the first of the next immediate at least one higher priority active modes.

It should also be appreciated that a silencing frame cannot be transmitted if the medium is busy (and that if the medium is not busy, the frame is transmitted). However, if the medium is busy, STA will wait until the medium becomes idle again before attempting to transmit the silencing frame. If the medium does not become idle again before the beginning of the next immediate higher priority active mode interval, controller 420 will not send a silencing frame.

On the other hand, if the silencing frame can be transmitted before the start of higher priority (e.g., BT) activity interval, i.e., sometime during the Δt period of time, then the network allocation vector (NAV) or duration is shortened to accommodate the remaining duration of Δt transmission window plus the duration of the at least one higher priority technology network active mode interval (e.g., ending of interval entitled "BT ON" in interval 520 or ending of interval entitled "WiMAX ON" in interval 530, both of FIG. 5). In other words, the value of NAV set at the beginning of Δt transmission window as calculated by calculator 440 is correspondingly reduced by the amount of time the medium remains busy after the maximum preferred frame transmission time has passed.

During certain intervals, a STA device participates in lower priority technology (WLAN) network, while during other intervals, it participates in higher priority technology networks (BT and WiMAX). In order to avoid the avalanche effect, a silencing frame (e.g., a CTS-to-self frame) is transmitted to the AP (from STA). If the silencing frame transmitted is a clear-to-send-to-self frame, it is preferably followed by a trigger frame (which could be a PS-Poll or a quality of service (QoS) Nul frame) indicating to the AP that STA is ready to receive data packets. The silencing frame—in this example, a CTS-to-self frame and subsequent consecutive trigger frame—have the network allocation vector (NAV) set to protect any higher priority technology network (in these examples, BT (interval 520) or BT and WiMAX (interval 530)) active mode period. Thus, the NAV is set to decrement until reaching the zero value at the ending of the higher priority active mode operation duration (which duration may encompass the total duration of more than one higher priority technologies' active modes). All other devices on the particular corresponding technology network, in this example WLAN, defer while their respective NAVs also decrement. Once a deferring device's NAV decrements to zero, the device no longer defers from accessing the medium, or sensing the medium to determine whether the medium is available. Hence, during the time identified in the transmitted silencing frame, no other—in this example—WLAN STA can transmit or receive from the AP. However, as noted above, the time at which a silencing frame is sent impacts the WLAN performance. To improve WLAN throughput, it is preferred that the silencing frame is not sent until $\Delta t$ time interval before the start of the next immediate higher priority (e.g., BT, WiMAX, etc.) period.

It should be appreciated that what is being referred to herein as a silencing frame may, in some embodiments, comprise more than one transmitted frame, e.g., such as a Clear-to-Send-to-Self frame immediately followed with a trigger frame. In such embodiments, the trigger frame is sent to prevent the other devices on the particular network from assuming that the original Clear-to-Send message was unsuccessful and begin to try to access the medium. However, once the trigger frame follows the Clear-to-Send frame, the other devices on the particular network set their respective NAV to the duration specified in the Clear-to-Send-to-Self frame, and defer until their respective NAV decrements to zero before again attempting to access the medium.

Furthermore, at least some embodiments enable transmission of a silencing frame from STA to take precedence by enabling STA to transmit a silencing frame after point coordination function interframe spacing (PIFS) time interval that the medium is idle. Thus, instead of waiting the customary distributed inter frame space (DIFS) interval before trying to gain access to the medium, it is preferred that the STA waits a PIFS interval before trying to gain access to the medium.

FIG. 5 illustrates an exemplary timing diagram of the operation of an embodiment of STA. In each of exemplary intervals 510, 520 and 530, the STA device completes at least one higher priority network active mode and at least one lower priority network active mode. The timing diagram illustrates the timing of transmission of three silencing frames, under three different scenarios. In interval 510, the silencing frame is randomly transmitted prior to the start of the high priority active mode operation interval; however, in intervals 520 and 530, the silencing frame is transmitted according to embodiments. Specifically, the first frame is sent, without benefit of present embodiments, during interval 510 by STA at a random time at any time during the lower priority active mode interval (WLAN ON, in this example); the second frame is sent, with the benefit of at least one present embodiment, during interval 520 by STA at a preferred time; and the third frame is sent, with benefit of at least one present embodiment, during interval 530 by STA at a respective preferred time. Each preferred time is determined by at least some embodiments as described above. FIG. 5 corresponds to a device STA that alternates among at least two dissimilar network technologies. As noted above, it should be understood that embodiments of the device may switch among more than two dissimilar network technologies. Specifically, there are three exemplary intervals (510, 520, 530) illustrated—each comprising at least one higher priority active mode interval (BT active mode ON and/or WiMAX active mode ON) and one lower priority active mode interval (WLAN active mode ON). In intervals 510 and 520, STA reserves the medium until the end of the BT active mode (ending of interval entitled "BT ON" in FIG. 5) in exemplary interval 520. It should be further understood that although the silencing frame of transmissions 540, 550 and 560 are illustrated to be "CTS2S tx" (clear-to-send-to-self transmission), that other types of silencing frames may be used instead.

Within exemplary interval 510, STA device transmits a silencing frame 540 with duration information for all interested devices to set their NAVs equal to the value of NAVA. It can be seen that there is no $\Delta t$ in the interval bounded by $NAV_A$. It should be understood that the transmission 540 of a silencing frame occurs randomly at any time within the lower priority technology active mode (e.g., "WLAN ON" in the present example). The time to transmit silencing frame is not predetermined or calculated to be at a specific time. Once it is sent, all interested devices on the respective network set their NAVs to the value corresponding to $NAV_A$. Because the timing of transmission 540 is random at any time within the lower priority technology active mode, transmission 540 regularly—and unnecessarily—ties up network resources which are obliged to defer until their respective NAVs have completely decremented.

Within exemplary interval 520, STA device transmits a silencing frame 550 with duration information for all interested devices to set their NAVs equal to the value of $NAV_B$. However, according to embodiments, the silencing frame may only be sent by the STA during the predetermined transmission window identified in interval 520 by "$\Delta t$". As noted above, $\Delta t$ transmission window is determined to preferably minimize the amount of time the STA device ties up corresponding technology network resources. The transmission 550 of silencing frame may occur at any time during the predetermined $\Delta t$ transmission window, depending upon whether the medium is busy, and in some embodiments, whether the STA waits PIFS instead of DIFS after the medium becomes available to transmit. If the medium is not busy, it is preferred that the STA transmit the silencing frame as close to the beginning of the predetermined $\Delta t$ transmission window as possible. If STA cannot transmit the silencing frame during the $\Delta t$ transmission window, it will not transmit a silencing frame at all to protect the upcoming higher priority technology active mode (e.g., "BT ON", in the present illustration).

Within exemplary interval 530, STA device transmits a silencing frame 560 with duration information for all interested devices to set their NAVs equal to the value of $NAV_C$. However, according to embodiments, the silencing frame may only be sent by the STA during the transmission window identified in interval 530 by "$\Delta t$". As with the embodiment of interval 520, $\Delta t$ transmission window of interval 530 is determined to preferably minimize the amount of time the STA device ties up corresponding technology network resources. The transmission 560 of silencing frame may occur at any time during the $\Delta t$ transmission window, depending upon whether the medium is busy, and in some embodiments, whether the STA waits PIFS instead of DIFS after the medium becomes available to transmit. If the medium is not busy, it is preferred that the STA transmit the silencing frame as close to the beginning of the predetermined $\Delta t$ transmission window as possible. If STA cannot transmit the silencing frame during the $\Delta t$ transmission window, it will not transmit a silencing frame at all to protect the at least one upcoming higher priority technology active mode(s) (e.g., "BT ON" and "WiMAX ON", in the present illustration).

It should be noticed that the $\Delta t$ transmission window ends prior to the beginning of the next immediate string of at least one higher priority technology network active modes in intervals 520 ("BT ON") and 530 ("BT ON and WiMAX ON"), respectively. The silencing frame transmission gap 570 shown in each interval (520,530) illustrates the time it takes to complete transmission of the silencing frame. In some embodiments, gap 570 also includes time for response from another device on the network and/or the time required for the device to switch from one network to the other. It is preferred that the transmission of the silencing frame start during the Δt transmission window. It is further preferred that if the transmission of the silencing frame is started just prior to the end of the Δt transmission window, the transmission of the silencing frame will be completed prior to the commencement of the next immediate (imminent) string of at least one higher priority active modes.

In exemplary interval 530, however, STA reserves the medium until the end of the WiMAX active mode (ending of interval entitled "WiMAX ON" in FIG. 5). Thus, STA device sends a CTS-to-self frame (example of a silencing frame) to protect all consecutive higher priority frames in the next immediate string of higher priority frames. In exemplary interval 530, STA device sends a silencing frame to protect the transmission from STA to AP, the acknowledgement from the AP to STA, the BT ON (active mode interval) and the WiMAX ON (active mode interval). It should also be understood that additional higher priority technology networks may immediately follow the two illustrated in FIG. 5; in such embodiments, STA would send a silencing frame at a preferred time which will protect all such consecutive high priority network activity (active mode intervals). In other words, the duration field of the silencing frame will be set to protect a string of as many consecutive higher priority active modes as needed for a device.

FIG. 6 illustrates a method for communicating. At block 610, the controller monitors traffic flow. Traffic flow monitored may comprise activity on the medium, as well as coordination of a device's shift between higher and lower priority active modes—for example, and not by way of limitation, either on a predetermined alternation schedule or based on a detected incoming transmission addressed to the device.

Controller calculates the duration, as well as timing, of a silencing frame transmission time window (block 620) and transmits a silencing frame only during the calculated window (block 630). In some embodiments, if the silencing frame was a clear-to-send-to-self frame, the device may immediately follow with a transmission of a trigger frame. Because the functionality of block 640 is optional—for example, it might not be used if the silencing frame transmitted by the device is not a clear-to-send-to-self frame—block 640 is shown in dashed outline.

FIG. 7 illustrates an exemplary method of calculating a silencing frame transmission time window (block 620 of FIG. 6), according to embodiments. It should be understood that although block 620 of FIG. 7 is shown as comprising functional blocks 710, 720 and 730, block 620 may comprise additional function blocks, or further combine those illustrated as desired. It should also be appreciated that any of the functional blocks 710, 720 and 730 may instead comprise a different element of a device.

At block 710, the transmission times from STA to AP and from AP to STA are determined. The transmission time from STA to AP can be determined because the transmission is from the STA. In some embodiments, the transmission times from the AP to STA are additionally or alternatively, measured and subsequently stored. The latest data rate and packet size are preferably selected to determine the transmission time from the AP to STA. The determined transmission times from AP to STA and STA to AP are added together (block 720) to determine the value of Δt, which is the duration of the silencing frame transmission time window. This value is subtracted (block 730) from the start time of the next immediate higher-priority technology subsystem network active mode to identify the Δt transmission window, which window bounds the time for STA to transmit a silencing frame to avoid avalanche effect while increasing network throughput. In some embodiments, the value of Δt is subtracted from the start time of an immediately following string of consecutive higher-priority technology subsystem network active modes. In some embodiments, the value may be calculated and stored in advance, then retrieved when the next immediate lower priority active mode begins. It should be appreciated that it is intended that "string" as used herein shall mean one or more.

Returning to block 630 of FIG. 6. STA may only transmit a silencing frame during the respective Δt transmission window to protect the upcoming at least one consecutive higher priority active modes. However, the STA device cannot transmit a silencing frame at all if the medium is busy. Thus, when the medium is busy, embodiments of STA device must defer and wait until the medium is not busy before transmitting a silencing frame. Thus, the STA's NAV is set at the beginning of the respective Δt transmission window, and is decremented until the medium is free. Upon accessing the medium, the value of then-decremented NAV is then transmitted as part of the silencing frame and follow-on trigger frame, if any.

FIG. 8 illustrates another exemplary method of calculating a preferred silencing frame transmission time (block 620 of FIG. 6), according to embodiments. It should be understood that although block 620 of FIG. 8 is shown as comprising functional blocks 810, 820, 830 and 840, block 620 may comprise additional function blocks, or further combine those illustrated as desired. It should also be appreciated that any of the functional blocks 810, 820, 830 and 840 may instead comprise a different element of a device.

At block 810, the transmission times from STA to AP and from AP to STA are determined. The transmission time from STA to AP can be determined because the transmission is from the STA. In some embodiments, the transmission times from the AP to STA are additionally or alternatively, measured and subsequently stored. The latest data rate and packet size are preferably selected to determine the transmission time from the AP to STA. The determined transmission times from AP to STA and STA to AP are added together (block 820) to determine the value of Δt, which is the duration of the silencing frame transmission time window. This value is added (block 830) to the total duration of the immediately upcoming string of at least one consecutive higher priority active modes which are to be protected. It should be appreciated that the duration when a higher priority technology network is active (in active mode) may also be referred to herein as an interval. As an example, and not by way of limitation, the total duration of the immediately upcoming at least one string of consecutive higher priority active modes in interval 530 of FIG. 5 would be the total combined duration of the BT ON and WiMAX ON periods. Returning to FIG. 8, the resulting sum from block 830 is subtracted from the end time of the last higher priority active mode in the next immediate higher-priority technology subsystem network active mode (block 840) to identify the beginning of the Δt transmission window, which window bounds the time for STA to transmit a silencing frame to avoid avalanche effect while increasing network throughput. In some embodiments, the value may be calculated and stored in advance, then retrieved when the next immediate lower priority active mode begins.

It should be appreciated that the total duration to be protected by the silencing frame preferably consists of the sum of the duration remaining of the predetermined transmission time window interval after the time it takes to transmit the silencing frame and the duration of the immediately upcoming string of at least one consecutive higher priority active mode interval.

FIG. 9 is illustrative of NAV setting for RxRx 900. Next generation wireless networks will include different subsystems in the same device. A mechanism that further improves the performance of the network by optimizing time reserved by CTS2Self frames being sent is disclosed. Hence, the overall throughput increases, while maintaining throughput at the coexistence node.

FIG. 9 is illustrative of Bluetooth™ and WLAN systems. Blocks 901 shows free blocks, 902 receive Rx and 905 transmission Tx in Bluetooth™. 907 depicts not allowed blocks for WLAN. 933 depicts data transmission Tx and WLAN Ack 935. Bluetooth™ BT is protected by CTS2Self NAV 920. The duration of CTS2Self is 910.

Transmission of CTS2Self frames for shared antenna and shared LNA for both subsystems is different with the case when the LNA is not shared. FIG. 9 is illustrative of what happens when reception window (i.e. receive-receive RxRx 900) is possible for both WLAN and BT. WLAN may receive during BT Rx if the data packet transmitted from the AP to the coexistence node plus the short interframe spacing (SIFS) makes the WLAN Ack 935 to be transmitted after BT packet reception has ended. However, the time duration of the data packet transmitted from the AP depends on the packet size, as well as on the physical rate at which the packet is transmitted. Hence $$Pck\_duration\_from\_AP = f(packet\_size\_from\_ap, ap\_phy\_rate).$$

Packet size statistics may be collected by observing the packets arriving from the AP over a duration of time, while the ap_phy_rate may be the last rate at which the packet from the AP was received at the coexistence node. Hence, the NAV duration at the CTS2Self frame sent from the coexistence node may be:

$$Nav\_duration = RxT\_time + BT\_Slot\_duration*2 - (BT\_Slot\_duration - BT\_pck\_rx\_duration) - Pck\_duration\_from\_AP - sifs\_time\_duration$$

Calculation of RxT_time may follow the procedure explained above. Note that an average backoff value may also be substracted from the above equation, where the backoff indicates that the AP (or other STAs) may need to perform a backoff procedure at the end of NAV set by CTS2Self frame before a packet is transmitted. Further optimization may be obtained if the Pck_duration_from_AP is larger than BT_pck_rx_duration. In that scenario, the Nav_duration set by CTS2Self may cover minimum up to the end of BT packet duration for BT Tx.

FIG. 10 is a flowchart illustrative of an exemplary method of receiving transmissions according to embodiments. It should be understood that although block 1000 of FIG. 10 is shown as comprising functional blocks 1010, 1020 and 1030, block 1000 may comprise additional function blocks, or further combine those illustrated as desired. It should also be appreciated that any of the functional blocks 1010, 1020 and 1030 may instead comprise a different element of a device.

At block 1010, a predetermined transmission window is calculated. At least two dissimilar networks are transmitting at 1020. At block 1030, a receiver receives the two transmissions from each of the at least two dissimilar wireless network technology subsystems during the predetermined reception window.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for the coexistence of multiple wireless technologies, comprising:
   providing a device comprising a first wireless technology subsystem with a first mode of operation and a second wireless technology subsystem with a second mode of operation wherein the first mode of operation has a higher priority that the second mode of operation;
   operating the device in the second mode of operation; and
   transmitting a silencing frame by the device only during a predetermined transmission window while operating in the second mode of operation and prior to a transition by the device to the first mode of operation;
   setting a length of a network allocation vector (NAV) of the silencing frame that is dependent on a length of time the device will operate in the first mode of operation and a data rate and/or a packet size during device operation in the second mode of operation; and
   adjusting the length of the silencing frame depending on where in the transmission window the silencing frame is transmitted.

2. The method of claim 1 where the first mode of operation is Bluetooth (BT) and the second mode of operation is wireless local area network (WLAN).

3. A system with co-existing multiple wireless technologies, comprising:
   a plurality of processors that execute instructions present in on-board processor memory;
   one or more of the processors communicatively coupled to a first wireless subsystem configured to operate in a first mode with a high priority and communicatively coupled to a second wireless subsystem configured to operate in a second mode with a low priority; and
   the system configured to determine a length of a network allocation vector (NAV) of a silencing frame, the silencing frame for transmission only during a predetermined transmission window when the system is in the second mode and before a switch by the system to the first mode wherein the length of the NAV of the silencing frame will depend on a time that the system will be in the first mode after the switch from the second mode and a data rate and/or a packet size in the second mode; and
   the system further configured to adjust the length of the silencing frame depending on where in the transmission window the silencing frame is to be transmitted.

4. The system of claim 3 further comprising one of more of the processors configured to provide medium access controller (MAC) functionality.

5. The system of claim 4 further comprising an interface communicatively coupled to one or more of the processors through which the one or more of the processors can communicate with the first wireless subsystem and the second wireless subsystem.

6. A system with co-existing multiple wireless technologies, comprising:
   a plurality of processors that execute instructions present in on-board processor memory;
   one or more of the processors communicatively coupled to at least one input device and at least one output device;
   one or more of the processors communicatively coupled to a first wireless subsystem configured to operate in a first mode with a high priority and communicatively coupled to a second wireless subsystem configured to operate in a second mode with a low priority;
   the system configured to determine a length of a network allocation vector (NAV) of a silencing frame, the silencing frame for transmission only during a predetermined transmission window when the system is in the second mode and before a switch by the system to the first mode wherein the length of the NAV of the silencing frame will depend on a time that the system will be in the first mode after the switch from the second mode and a data rate and/or a packet size in the second mode; and the system further configured to adjust the length of the silencing frame depending on where in the transmission window the silencing frame is to be transmitted.

7. The system of claim 6 further comprising one of more of the processors configured to provide medium access controller (MAC) functionality.

8. The system of claim 7 further comprising an interface communicatively coupled to one or more of the processors through which the one or more of the processors can communicate with the first wireless subsystem and the second wireless subsystem.

9. The system of claim 8 wherein the at least one input device is selected from a group consisting of a keyboard, a touchpad, a mouse and a voice recognizer.

10. The system of claim 9 wherein the at least one output device is selected from a group consisting of a liquid crystal display (LCD), printer, touch screen display and a light-emitting diode (LED).

11. The system of claim 8 wherein the at least one input device and the at least one output device is a touch screen display.

12. The method of claim 8 where the first mode of operation is Bluetooth (BT) and the second mode of operation is wireless local area network (WLAN).

13. A wireless system with co-existing multiple wireless technologies, comprising:
   a plurality of processors that execute instructions present in on-board processor memory;
   one or more of the processors communicatively coupled to at least one input device and at least one output device;
   one or more of the processors communicatively coupled to a wireless modem that is coupled to a radio frequency (RF) antenna;
   one or more of the processors configured to provide medium access controller (MAC) functionality;
   one or more of the processors communicatively coupled to a first wireless subsystem configured to operate in a first mode with a high priority and communicatively coupled to a second wireless subsystem configured to operate in a second mode with a low priority;
   the system configured to determine a length of a network allocation vector (NAV) of a silencing frame, the silencing frame for transmission only during a predetermined transmission window when the system is in the second mode and before a switch by the system to the first mode wherein the length of the NAV of the silencing frame will depend on a time that the system will be in the first mode after the switch from the second mode and a data rate and/or a packet size in the second mode; and
   the system further configured to adjust the length of the silencing frame depending on where in the transmission window the silencing frame is to be transmitted.

14. The system of claim 13 further comprising an interface communicatively coupled to one or more of the processors through which the one or more of the processors can communicate with the first wireless subsystem and the second wireless subsystem.

15. The system of claim 13 wherein the at least one input device is selected from a group consisting of a keyboard, a touchpad, a mouse and a voice recognizer.

16. The system of claim 15 wherein the at least one output device is selected from a group consisting of a liquid crystal display (LCD), printer, touch screen display and a light-mitting diode (LED).

17. The system of claim 13 wherein the at least one input device and the at least one output device is a touch screen display.

18. The method of claim 13 where the first mode of operation is Bluetooth (BT) and the second mode of operation is wireless local area network (WLAN).

* * * * *